United States Patent
Matsutani et al.

(10) Patent No.: US 11,145,874 B2
(45) Date of Patent: Oct. 12, 2021

(54) CATALYST FOR SOLID POLYMER FUEL CELLS AND METHOD FOR PRODUCING SAME

(71) Applicant: TANAKA KIKINZOKU KOGYO K.K., Tokyo (JP)

(72) Inventors: Koichi Matsutani, Hiratsuka (JP); Wataru Hashimoto, Hiratsuka (JP); Takeshi Kaieda, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 187 days.

(21) Appl. No.: 16/605,738

(22) PCT Filed: Apr. 16, 2018

(86) PCT No.: PCT/JP2018/015645
§ 371 (c)(1),
(2) Date: Oct. 16, 2019

(87) PCT Pub. No.: WO2018/194008
PCT Pub. Date: Oct. 25, 2018

(65) Prior Publication Data
US 2021/0126264 A1 Apr. 29, 2021

(30) Foreign Application Priority Data

Apr. 18, 2017 (JP) .............................. JP2017-081897

(51) Int. Cl.
| H01M 4/02 | (2006.01) |
| H01M 4/92 | (2006.01) |
| H01M 4/88 | (2006.01) |
| H01M 4/90 | (2006.01) |
| H01M 8/1018 | (2016.01) |

(52) U.S. Cl.
CPC ......... H01M 4/921 (2013.01); H01M 4/8882 (2013.01); H01M 4/9058 (2013.01); H01M 4/9083 (2013.01); H01M 8/1018 (2013.01); H01M 2008/1095 (2013.01)

(58) Field of Classification Search
CPC ........ H01M 4/921; H01M 4/923; H01M 4/92; H01M 4/8882; H01M 4/8878; H01M 4/9058; H01M 4/9083; H01M 8/1018; H01M 2008/1095
See application file for complete search history.

(56) References Cited

U.S. PATENT DOCUMENTS

| 8,178,260 B2 * | 5/2012 | Horiuchi ................. H01M 4/92 429/524 |
| 2007/0087261 A1 | 4/2007 | Endoh et al. |
| 2009/0117450 A1 * | 5/2009 | Iisaka .................... G01N 31/10 429/489 |
| 2009/0255373 A1 | 10/2009 | Yamamura et al. |
| 2010/0183945 A1 * | 7/2010 | Kurungot ............ H01M 8/1025 429/485 |

FOREIGN PATENT DOCUMENTS

| EP | 0 557 674 A1 | 9/1993 |
| EP | 2 650 956 | 10/2013 |
| EP | 2 953 195 | 12/2015 |
| EP | 3 211 696 A | 8/2017 |
| JP | H04-141236 A | 5/1992 |
| JP | H10-302809 A | 11/1998 |
| JP | 2005-302527 A | 10/2005 |
| JP | 2009-249722 A | 10/2009 |
| JP | 2010-027364 A | 2/2010 |
| JP | 2011-150867 A | 8/2011 |
| JP | 2013-131420 A | 7/2013 |
| WO | WO-2016/063968 A | 4/2016 |

OTHER PUBLICATIONS

International Searching Authority, "International Search Report," issued in connection with International Patent Application No. PCT/JP2018/015645, dated Jul. 10, 2018.
International Searching Authority, "Written Opinion," issued in connection with International Patent Application No. PCT/JP2018/015645, dated Jul. 10, 2018.
Extended European Search Report dated Apr. 8, 2020 for corresponding European Patent Application No. 18787888.9.

* cited by examiner

Primary Examiner — Raymond Alejandro
(74) Attorney, Agent, or Firm — Foley & Lardner LLP (57) ABSTRACT

The present invention relates to a catalyst for solid polymer fuel cells in which catalyst particles including platinum and a transition metal M are supported on a carbon powder carrier. The catalyst of the present invention is a catalyst for solid polymer fuel cells in which a molar ratio (Pt/M) of platinum to the transition metal M that form catalyst particles is 2.5 or more, and a ratio ($S_{COMSA}/S_{BET}$) of a platinum specific surface area ($S_{COMSA}$) measured by a CO adsorption method to a catalyst specific surface area ($S_{BET}$) measured by a BET method is 0.26 or more and 0.32 or less. The catalyst can be produced by preparing an alloy catalyst, then washing the alloy catalyst with a platinum compound solution, and additionally supplying platinum to the surfaces of catalyst particles.

14 Claims, 2 Drawing Sheets

CATALYST FOR SOLID POLYMER FUEL CELLS AND METHOD FOR PRODUCING SAME

RELATED APPLICATIONS

The present application claims priority under 37 U.S.C. § 371 to International Patent Application No. PCT/JP2018/015645, filed Apr. 16, 2018, which claims priority to and the benefit of Japanese Patent Application No. 2017-081897, filed on Apr. 18, 2017. The contents of these applications are hereby incorporated by reference in their entireties.

TECHNICAL FIELD

The present invention relates to a catalyst for solid polymer fuel cells, and particularly to a catalyst which is suitably used in cathodes (air electrodes) for solid polymer fuel cells.

BACKGROUND ART

Practical realization of fuel cells once termed as future power generation systems have come to be realistic as expected, and at present, popularization of fuel cells is desired. Fuel cells are classified into several types, and in particular, solid polymer fuel cells have the advantage of operating at a low temperature and having a small size. Thanks to such an advantage, solid polymer fuel cells are considered as promising automobile power sources and domestic power sources. A solid polymer fuel cell has a layered structure in which a solid polymer electrolyte membrane is sandwiched between a hydrogen electrode (anode) and an air electrode (cathode). A fuel including hydrogen and oxygen or air is supplied to the hydrogen electrode and the air electrode, respectively, and power is generated by means of oxidation and reduction reactions taking place at the electrodes. In addition, a mixture of a solid electrolyte and a catalyst for accelerating electrochemical reaction is generally applied for both the electrodes.

As catalysts for forming the electrodes, catalysts are widely used in which a precious metal, particularly platinum, is supported as a catalyst metal. This is because platinum as a catalyst metal has high activity in acceleration of electrode reaction at both a fuel electrode and a hydrogen electrode.

There have been an increasing number of cases where an alloy catalyst including platinum and another transition metal as a catalyst metal is examined for securing catalytic activity while reducing the use amount of platinum for reducing catalyst cost. For example, a Pt—Co catalyst having catalyst particles of alloy of platinum and cobalt is known as a catalyst, which is capable of exhibiting activity higher than that of a platinum catalyst while allowing the use amount of platinum to be reduced (Patent Document 1). Further, a ternary alloy catalyst has been reported in which platinum is formed into alloy with not only cobalt but also another transition metal for further improving the Pt—Co catalyst (Patent Document 2).

RELATED ART DOCUMENT

Patent Documents

Patent Document 1: JP 2010-27364 A
Patent Document 2: JP 2011-150867 A

SUMMARY OF THE INVENTION

Problems to be Solved by the Invention

Here, examples of the properties required for solid polymer fuel cell include favorable initial activity, and also durability, that is, sustainability of catalytic activity. Catalysts cannot be prevented from undergoing reduction of activity (deactivation) which occurs with elapse of time, and prolongation of time until deactivation may be essential for practical realization and popularization of fuel cells. In particular, cathode catalysts for solid polymer fuel cells are used under the severe conditions of being exposed to a strong-acidic atmosphere and placed under a high potential load at a relatively high temperature of about 80° C., and therefore improvement of durability has been a major issue for practical realization of the fuel cells.

The platinum alloy catalysts such as Pt—Co catalysts are ones on which a certain level of studies have been heretofore conducted in terms of cost reduction and initial activity. However, in view of recent situations in which fuel cells have been realistically popularized, it is necessary to further improve durability. Thus, the present invention provides an alloy catalyst for solid polymer fuel cells which includes alloy of platinum and another metal, the alloy catalyst having excellent initial activity and improved durability.

Means for Solving the Problems

For achieving the above-described objective, the present inventors conducted studies on improvement of durability in terms of, for example, improvement of a method for producing a conventional catalyst for solid polymer fuel cells in which platinum and a transition metal (M) are as a catalyst metal. As a result, it was found that when a conventional catalyst in which platinum and a transition metal (M) were supported and formed into alloy was further brought into contact with a platinum compound solution to additionally precipitate platinum on the surfaces of catalyst particles, it was possible to improve the durability of the catalyst. The present inventors conducted minute studies on the configuration of a catalyst obtained by a producing process of the catalyst, and resultantly confirmed that the platinum alloy as a catalyst particles had a platinum specific surface area (COMSA) larger than that of a usual catalyst. The catalyst producing process including the step of additionally precipitating platinum will be described in detail later. The present inventors arrived at the present invention on the basis of the above findings.

That is, the present invention provides a catalyst for solid polymer fuel cells in which catalyst particles including platinum and a transition metal M are supported on a carbon powder carrier, and in the catalyst for solid polymer fuel cells, a molar ratio (Pt/M) of the platinum to the transition metal M in the catalyst particles is 2.5 or more, and a ratio ($S_{COMSA}/S_{BET}$) of a platinum specific surface area ($S_{COMSA}$) measured by a CO adsorption method to a catalyst specific surface area ($S_{BET}$) measured by a BET method is 0.26 or more and 0.32 or less.

Hereinafter, the catalyst for solid polymer fuel cells according to the present invention will be described in detail. First, the present invention provides a catalyst in which platinum and a transition metal M are supported on a carbon powder carrier, the catalyst including catalyst particles including alloy of platinum and the transition metal M. The molar ratio (Pt/M) of platinum to the transition metal M in catalyst particles is 2.5 or more. The requirement of the molar ratio represents a criterion specified with consideration given to influences of the supporting ratio of catalyst metals (platinum and transition metal M) on activity (initial activity). The molar ratio is a standard for giving a criterion on a preferred catalyst with the supporting amount of platinum with respect to the transition metal M clarified while influences of the supporting ratio of catalyst metals eliminated. A catalyst in which the molar ratio (Pt/M) of platinum to the transition metal M is less than 2.5 has a low ratio of platinum, so that it is difficult to secure activity. The upper limit of the molar ratio (Pt/M) is not particularly limited, but is preferably 10.0 for reliably obtaining the effect of improving activity by the transition metal and in consideration of costs associated with an increase in supporting amount of platinum.

The molar ratio of the catalyst metals can be determined by an analysis method including directly measuring the contents of metals in a catalyst by, for example, ICP, or a component analysis method using an electron beam/X-ray spectroscopic analysis instrument such as EPMA or EDX. The former method, which is direct analysis by ICP or the like, is preferable from the viewpoint of accuracy.

Here, the transition metal M supported together with platinum is preferably at least one transition metal selected from cobalt, nickel, manganese, iron, titanium, vanadium, chromium, copper, zinc and zirconium. In particular, at least one of cobalt and nickel is preferable. Further, a plurality of transition metals can be supported, and for example, cobalt and manganese can be supported, and alloyed with platinum to prepare catalyst particles. When a plurality of transition metals M is applied, the total number of moles of the transition metals is applied for the molar ratio (Pt/M) of platinum to the transition metals M.

In the present invention, the ratio ($S_{COMSA}/S_{BET}$) of a platinum specific surface area ($S_{COMSA}$) measured by a CO adsorption method to a catalyst specific surface area ($S_{BET}$) measured by a BET method is 0.26 or more. In the catalyst according to the present invention, the surface area (specific surface area) of platinum exposed to the surfaces of catalyst particles is larger as compared to usual catalysts. For the purpose of clearly showing this point, the ratio ($S_{COMSA}/S_{BET}$) of the platinum specific surface area ($S_{COMSA}$) to the catalyst specific surface area ($S_{BET}$) is specified in the present invention. As will be described later, platinum is additionally precipitated on catalyst particles after alloy formation in the catalyst according to the present invention. The catalyst particles are at least partially coated (covered) with the platinum. Because of presence of additional platinum, the catalyst particles in the catalyst of the present invention have a platinum specific surface area greater than that of the catalyst particles in a conventional catalyst having no additional platinum. That is, the ratio ($S_{COMSA}/S_{BET}$) of the platinum specific surface area ($S_{COMSA}$) to the catalyst specific surface area ($S_{BET}$) in the catalyst of the present invention is larger than the ratio ($S_{COMSA}/S_{BET}$) of the platinum specific surface area ($S_{COMSA}$) to the catalyst specific surface area ($S_{BET}$) in the conventional catalyst.

In the present invention, the platinum specific surface area ($S_{COMSA}$) measured by a CO adsorption method is applied as a platinum specific surface area. The CO adsorption method, which is one of methods for measuring the specific surface area of a substance by a gas adsorption method, is an analysis method in which measurement is performed by using a CO gas as an adsorbate for detecting platinum exposed on the surface of a catalyst. The CO adsorption method is a relatively convenient method, and by this method, the specific surface area of exposed platinum (m$^2$/g-Pt) can be adequately measured.

In the present invention, the ratio of the platinum specific surface area ($S_{COMSA}$) to the catalyst specific surface area ($S_{BET}$) measured by the BET method is specified. The catalyst specific surface area ($S_{BET}$) is a specific surface area of the entire catalyst. Thus, the catalyst specific surface area ($S_{BET}$) is different from the platinum specific surface area ($S_{COMSA}$) representing only the surface area of platinum exposed to the surfaces of catalyst particles. The specific surface area of the entire catalyst is a specific surface area corresponding to the surface of the entire catalyst including the surface area of the carrier and the surface area of catalyst particles. The surface area of catalyst particles is the surface area off all catalyst particles including metal portions other than platinum. The BET method, which is one of methods for measuring the specific surface area of a substance by a gas adsorption method, is a measurement method using as an adsorbate an inert gas such as nitrogen. The BET method is the best-known method as a method for measuring the specific surface area of a catalyst or a carbon powder carrier.

For the purpose of clearly showing that the catalyst of the present invention has a platinum specific surface area ($S_{COMSA}$) larger than that in the conventional art, both the platinum specific surface area ($S_{COMSA}$) and the catalyst specific surface area ($S_{BET}$) are used. That is, when the catalyst of the present invention is simply specified only in the platinum specific surface area ($S_{COMSA}$), the present invention includes a catalyst having a large overall catalyst surface area. The feature of the present invention does not lie in increasing the catalyst specific surface area ($S_{BET}$). Thus, for clarifying the basis of the scope of the present invention, the ratio of the platinum specific surface area ($S_{COMSA}$) to the catalyst specific surface area ($S_{BET}$) is applied.

In the present invention, the ratio ($S_{COMSA}/S_{BET}$) of a platinum specific surface area ($S_{COMSA}$) measured by a CO adsorption method to a catalyst specific surface area ($S_{BET}$) measured by a BET method is specified as 0.26 or more. In a catalyst having a $S_{COMSA}/S_{BET}$ ratio of less than 0.26, the amount of platinum exposed to the surfaces of catalyst particles is low, and comparable to that in the conventional art. Such a catalyst hardly exhibits a durability improving effect. Thus, in the present invention, the $S_{COMSA}/S_{BET}$ ratio is specified as 0.26 or more.

The results of studies by the present inventors show that when the value of the $S_{COMSA}/S_{BET}$ ratio increases, the durability improving effect is exhibited. The $S_{COMSA}/S_{BET}$ ratio is more preferably 0.275 or more. However, the catalyst properties of a catalyst in which an excessive amount of platinum is present on the surfaces of catalyst particles are significantly influenced by the platinum. In this respect, platinum has initial activity relatively lower than that of platinum alloy, and therefore a catalyst having an excessive amount of platinum may have low initial activity. In view of this point, the upper limit of the $S_{COMSA}/S_{BET}$ ratio is preferably 0.32.

As described above, the catalyst according to the present invention has catalyst particles including alloy of platinum and a transition metal M, and in the catalyst, the ratio of the specific surface area of platinum to the specific surface area of the entire catalyst is increased to improve durability. Here, the present inventors conducted minute studies on the state of the platinum having an additionally increased specific surface area. From the results of the studies, the present inventors consider that the additional platinum in the present invention is preferably platinum in a state of being bonded in some degree to the platinum alloy forming catalyst particles rather than platinum in a state of atomic platinum (platinum atoms).

The state of the additional platinum in the present invention will be described in more detail. It is preferable that the additional platinum in the present invention is precipitated in a state of having low crystallinity on the surfaces of catalyst particles rather than being precipitated as crystalline atomic platinum. As a specific phenomenon, it is preferable that in X-ray diffraction analysis of the catalyst according to the present invention, a peak derived from crystalline atomic platinum has a low peak intensity. The peak derived from crystalline atomic platinum appears in the vicinity of $2\theta=67.4°$. As a specific index, the ratio ($I_{Pt}/I_{cat}$) of the peak intensity (It) of atomic platinum at $2\theta=67.4°$ to the peak intensity ($I_{cat}$) of a main peak appearing in a range of $2\theta=69°$ to $71°$ is preferably 0.35 or less. Here, the catalyst main peak appearing in a range of $2\theta=69°$ to $71°$ as a basis is a peak derived from alloy of platinum and a transition metal M. The value of the $I_{Pt}/I_{cat}$ ratio is more preferably 0.30 or less, still more preferably 0.25 or less. The present inventors consider that it is possible to obtain a catalyst having high initial activity and favorable durability by specifying the state of additional platinum as described above.

The atomic platinum-derived peak position (67.4°) is close to the peak position of the catalyst main peak (69° to 71°). Therefore, the peak derived from crystalline platinum may be turned into a shoulder-like peak as a result of being superimposed on the main peak. In this case, it is preferable that waveform separation is appropriately performed, and the atomic platinum-derived peak intensity is evaluated. Further, in the above analysis and evaluation of the peak intensity, it is preferable that the background intensity is subtracted so that the absorption intensity at $2\theta=64°$ is 0, and each peak intensity is then measured.

It is preferable for the catalyst particles in the present invention to have an average particle size of 2 to 20 nm. When the average particle size is less than 2 nm, long-time activity sustainability cannot be reliably obtained, and when the average particle size is more than 20 nm, the catalyst cannot exhibit sufficient initial activity. The average particle size of the catalyst particles is more preferably 50 nm or less, still more preferably 5 nm or less. The average particle size of catalyst particles is a particle size of only active metal (platinum or platinum alloy) particles, which is a size of connected crystals (also referred to as a crystallite diameter), and does not include the particle size of a carrier. The catalyst particle size can be calculated from an XRD peak half width in accordance with the following Scherrer equation.

$$R=0.9\lambda/(W \cos \theta) \quad \text{[Formula 1]}$$

(R: particle size (crystallite diameter)/nm, λ: wavelength of X-ray used (for example, 0.154 nm in Cu Kα ray), W: peak half width/degree, θ: incidence light/degree)

In addition, the supporting ratio of catalyst particles in the catalyst according to the present invention is preferably 30% to 70% in consideration of the performance of an electrode for a solid polymer fuel cell. The supporting ratio here is a ratio of the mass of catalyst particles supported on a carrier (the total of the mass of supported platinum and the mass of the transition metal M) to the mass of the entire catalyst.

A method for producing a catalyst for solid polymer fuel cells according to the present invention will now be described. The method for producing a catalyst according to the present invention is the same as a conventional method for producing a platinum alloy catalyst so far as basic process is concerned. In accordance with the above-described patent document, platinum and a transition metal M, which form catalyst particles, are supported on a carrier, and heat treatment is then performed to form the platinum and the transition metal M into alloy. The catalyst after the heat treatment is brought into an oxidizing solution to moderately elute the transition metal M in the catalyst particles. By the above steps, a platinum alloy catalyst can be obtained.

The catalyst producing process in the present invention is characterized in that an additional step of supporting platinum is added to the above-described conventional catalyst producing process. The additional step is a step of additionally supporting platinum to the catalyst by bringing a platinum compound solution into contact with the platinum alloy catalyst produced in the conventional producing process. That is, the method for producing a catalyst for solid polymer fuel cells according to the present invention includes the steps of: supporting a transition metal M on a platinum catalyst in which platinum particles are supported on a carbon powder carrier; subjecting the platinum catalyst, on which the transition metal M is supported, to heat treatment at 700 to 1100° C.; bringing the catalyst after the heat treatment into contact with an oxidizing solution at least once; and bringing a platinum compound solution into contact with the catalyst treated with the oxidizing solution. Hereinafter, the steps of the catalyst producing process in the present invention will be described.

In the step of supporting a catalyst metal on a carrier, a platinum catalyst in which platinum is supported is prepared, and a transition metal M is supported on the platinum catalyst. When a platinum catalyst is produced, a general chemical reduction method is carried out. That is, by mixing a platinum compound solution with a carrier, adding a reducing agent, and refluxing the mixture, platinum particles as a catalyst metal are precipitated, and supported on a carrier to produce a platinum catalyst.

It is preferable that as the carbon powder as a carrier, carbon powder having a specific surface area of 250 m²/g to 1200 m²/g is applied. When the specific surface area is 250 m²/g or more, the area over which the catalyst deposited can be increased, so that catalyst particles can be dispersed at a high level to increase the effective surface area, and when the specific surface area is more than 1200 m²/g, the abundance ratio of ultrafine pores (having a pore size of less than about 20 Å) which an ion-exchange resin hardly enter in formation of an electrode increases, so that the utilization efficiency of the catalyst particles is reduced.

The platinum compound solution to be adsorbed to the carrier is preferably a dinitrodiammine platinum nitric acid solution, a chloroplatinate aqueous solution, a potassium chloroplatinate aqueous solution or the like. Further, it is preferable that at the time when the platinum compound solution is adsorbed to the carbon powder carrier, the platinum compound solution is mixed with the carbon powder while grinding is performed. Since the step of absorbing the solution is a step of supporting platinum ions of the platinum compound solution on the carrier, the dispersibility and supporting state of the platinum ions may vary depending on how the step is operated. By adsorbing the platinum compound solution while grinding the carrier in the adsorption step, the dispersion state of platinum ions can be optimized.

A reducing agent is added to the mixed solution of a platinum compound solution and a carrier which is obtained in the above-described step. The reducing agent is preferably an alcohol (methanol, ethanol or the like). As reflux (reduction) conditions after addition of the reducing agent, it is preferable that the temperature of the mixed solution is not lower than 60° C. and not higher than the boiling temperature, and the reduction time is 3 hours or more and 6 hours or less.

A transition metal M is supported on the platinum catalyst obtained in the above step. Preferably, a chemical adsorption method is also applied in the step of supporting the transition metal M. A metal salt solution of the transition metal M is brought into contact with the platinum catalyst, so that reduction treatment is performed to precipitate the transition metal M in a metal state in the vicinity of platinum particles. For the metal salt solution, chlorides, nitrates, acetates and sulfates of metals can be applied. For example, when cobalt is supported, cobalt chloride hexahydrate, cobalt nitrate, cobalt acetate tetrahydrate and the like can be used. When a plurality of transition metals is supported on the platinum catalyst, the order in which metal salt solutions are brought into contact with the platinum catalyst is not particularly limited, and the metal salt solutions may be individually brought into contact with the platinum catalyst, or a mixed liquid of a plurality of metal salt solutions may be brought into contact with the platinum catalyst.

The supporting amount of the transition metal M in the step of supporting the transition metal M is adjusted by the concentration and the amount of the metal salt solution. Here, in the catalyst according to the present invention, the range of the molar ratio (Pt/M) of platinum and the transition metal M is specified (2.5 or more), and the supporting of the transition metal M is adjusted so that the molar ratio (Pt/M) falls within this range. However, in the producing method of the present invention, the catalyst after alloy formation is treated with an oxidizing solution to partially elute the transition metal M as described later. Thus, it is preferable that the supporting amount of the transition metal here is larger with respect to the set composition ratio. Specifically, the supporting amount of the transition metal is preferably larger by a factor of about 1.4 to 3 than the supporting amount equivalent to the composition ratio.

After the transition metal M is supported on the platinum catalyst, drying is performed as necessary, and heat treatment is then performed to form platinum and the transition metal M into alloy. The heat treatment temperature for the alloy formation is 700 to 1100° C. In heat treatment at a temperature of lower than 700° C., formation of a platinum alloy phase is insufficient, and a catalyst having poor activity is obtained. Further, progression of alloy formation is facilitated as the heat treatment temperature increases, but heat treatment at a temperature of higher than 1100° C. may coarsen catalyst particles, and is difficult to perform in terms of equipment. Therefore, the upper limit of the heat treatment temperature is 1100° C. The heat treatment is performed preferably in a non-oxidizing atmosphere, particularly preferably in a reducing atmosphere (hydrogen gas atmosphere or the like).

The catalyst passing through the heat treatment step is brought into contact with an oxidizing solution. By the treatment with the oxidizing solution, the transition metal is partially eluted on the surfaces of catalyst particles. The effect of the treatment varies depending on the type of the transition metal M, and it has been shown that an activity improving effect and a durability improving effect are obtained as a result of reduction in concentration of the transition metal M on the surfaces of catalyst particles. Further, it has been shown that elution of the transition metal M on the surfaces of catalyst particles turns the form of particles into a skeleton shape (frame shape).

The oxidizing solution is preferably a solution of sulfuric acid, nitric acid, phosphorous acid, potassium permanganate, hydrogen peroxide, hydrochloric acid, chloric acid, hypochlorous acid, chromic acid or the like. The concentration of such an oxidizing solution is preferably 0.1 to 1 mol/L, and immersing the catalyst in the solution is preferable.

As conditions for oxidizing solution treatment, the contact time is preferably 1 to 30 hours, more preferably 2 hours or more. The treatment temperature is preferably 40 to 110° C., more preferably 60° C. or higher. The oxidizing solution treatment may be performed with the catalyst brought into contact with the oxidizing solution not only once but also two or more times repeatedly. When a plurality of acid treatments is performed, the type of solution may be changed for each treatment.

The method for producing a catalyst according to the present invention includes a step of bringing a platinum compound solution into contact with the catalyst after the oxidizing solution treatment to additionally support platinum.

The surfaces of catalyst particles treated with the oxidizing solution are supposed to be in a state of a skeleton having irregularities due to elution of the transition metal M as described above. It is considered that when treatment with the platinum compound solution in the present invention is performed, platinum in the platinum solution is precipitated in gap portions between the surfaces of catalyst particles having a skeletal shape, and bonded to the platinum alloy of the catalyst particle base.

Further, the present inventors consider that precipitation of platinum due to contact with the additional platinum compound solution is caused by displacement reaction between a metal (platinum or transition metal) on the surfaces of catalyst particles and platinum ions in the platinum compound solution. The platinum compound solution which easily exhibits such a displacement action is a dinitrodiammine platinum nitric acid solution, a chloroplatinate aqueous solution, a potassium chloroplatinate aqueous solution or the like. Therefore, in the treatment with the additional platinum compound solution in the present invention, it is preferable to use the above-mentioned platinum compound solution.

In the platinum compound solution treatment, it is preferable to try to add an appropriate amount of platinum. When platinum is excessively precipitated, the activity of the catalyst may be affected. Regarding the added amount of the platinum, a 1 atom-equivalent platinum amount per atom of platinum exposed to the surfaces of catalyst particles in a catalyst to be treated (that is, catalyst after oxidizing solution treatment) serves as an index. The added amount of the platinum can be adjusted by the content of platinum in the platinum compound solution.

The content of platinum in the solution in the platinum compound solution treatment can be set in accordance with various physical properties of the treatment object catalyst after oxidizing solution treatment. It is preferable that specifically, the platinum weight $M_{Pt}$ (g) during platinum compound solution treatment is given by the following formula. In the following formula, the weight of the catalyst after oxidizing solution treatment is represented by $M_{cat}$ (g). Further, the platinum specific surface area of the catalyst which is measured by a CO adsorption method is represented by $S_{COMSA-PRE}$ (m²/g-Pt). Further, the platinum content $R_{Pt}$ (% by weight) in the catalyst is represented by $R_{Pt}$.

$$M_{Pt} = S_{COMSA-PRE} \times \frac{Q}{x \times F} \times 195.08 \times M_{cat} \times R_{Pt} \qquad \text{[Formula 2]}$$

(Q: adsorption amount of electricity per unit area (4.2C·m$^{-2}$ in reaction system in the present invention, n: number of reacted electrons (n=2 in the present invention), F: Faraday constant (9.65×10$^4$C·mol$^{-1}$. The value "195.08" in the formula denotes an atomic weight (g·mol$^{-1}$) of platinum.)

In the treatment with the additional platinum compound solution in the present invention, it is preferable that a catalyst to be treated is dispersed in a solvent, and a platinum compound solution is added to the resulting dispersion. The solvent in which the catalyst is dispersed is not particularly limited. As the solvent, an aqueous solution such as water or an acid, or a mixture of water and a water-soluble organic solvent can be used depending on the hydrophilicity of carbon. Examples of the water-soluble organic solvent include, but are not limited to, water-soluble alcohols such as ethanol, water-soluble ketones such as acetone, and water-soluble amides such as dimethyl formamide.

The platinum compound treatment time (contact time) is preferably 3 to 48 hours, more preferably 20 hours or more. The treatment temperature is preferably 10° C. to 40° C., more preferably 15° C. to 25° C. It is preferable that after the treatment, the catalyst powder is filtered and recovered, washed and dried. Preferably, the drying is performed at 50 to 70° C. or lower.

As a result of the treatment with the platinum compound solution, a catalyst for polymer solid electrolyte fuel cells according to the present invention is produced in which the platinum specific surface area (S$_{COMSA}$) falls within a predetermined range. Further, by appropriately selecting a platinum compound solution, and bringing the catalyst and the platinum compound solution into sufficient contact with each other as described above, platinum precipitated from the solution is bonded to the catalyst particle (platinum alloy) base. Further, the catalyst brought into contact with the platinum compound solution is appropriately washed and dried after the treatment, so that the amount of remaining atomic platinum can be reduced. Heat treatment and reduction treatment are not necessary after the platinum compound solution treatment.

According to the present invention, a conventional catalyst including catalyst particles including platinum and a transition metal M is subjected to a relatively simply treatment with a platinum compound solution to prepare a catalyst for polymer solid electrolyte fuel cells which has high durability.

DESCRIPTION OF EMBODIMENTS

Hereinafter, a preferred embodiment of the present invention will be described. In the embodiments, a platinum alloy catalyst including cobalt or nickel as a transition metal M was produced, the properties of the catalyst were examined, and the catalytic activity was evaluated.

Example 1: In this example, an alloy catalyst of platinum and cobalt (Pt—Co catalyst) was produced. In this example, a platinum catalyst was produced, cobalt was supported, and alloy formation heat treatment and oxidizing solution treatment were performed to produce a platinum alloy catalyst. Further, platinum compound solution treatment was performed to produce a Pt—Co catalyst of Example 1. A detailed method for producing the catalyst is as follows.

[Supporting Catalyst Metals (Platinum and Transition Metal M)]

For producing a platinum catalyst, carbon fine powder (specific surface area: 850 m$^2$/g, trade name: OSAB) as a carrier was prepared. 1000 g of a dinitrodianmine platinum nitric acid solution having a platinum concentration of 4.6% by mass (platinum content: 46 g) as a platinum solution and 46 g of carbon fine powder were added into a producing vessel, and mixed while being ground. Thereafter, 540 mL of 100% ethanol was added as a reducing agent, and the mixture was mixed. The mixed solution was refluxed and reacted at about 85° C. for 4 hours to reduce the platinum. Thereafter, filtration, drying and washing were performed. A platinum catalyst was obtained by the above steps. The result of X-ray diffraction showed that the platinum particle size was 2.1 nm.

Cobalt was supported on the platinum catalyst produced as described above. 100 g of cobalt chloride hexahydrate (CoCl$_2$.6H$_2$O) was dissolved in 500 mL of water to prepare a metal salt solution as a metal solution, and the platinum catalyst was immersed in and mixed with the solution. To this solution was added dropwise 10 L of a sodium borohydride (SBH) solution having a concentration of 1% by mass, the mixture was stirred, and subjected to reduction treatment, and cobalt was supported on the platinum catalyst. Thereafter, filtration, washing and drying were performed. By the above operations, a catalyst having platinum and cobalt supported on a carbon fine powder carrier was obtained.

[Alloy Formation Heat Treatment]

The catalyst in which a catalyst metal was supported was subjected to heat treatment for alloy formation. In this embodiment, heat treatment was performed in 100% hydrogen gas at a heat treatment temperature of 900° C. for 0.5 hours.

[Oxidizing Solution Treatment]

The catalyst after the heat treatment was treated with an oxidizing solution. First, the catalyst after heat treatment was treated in a 0.5 mol/L sulfuric acid aqueous solution at 80° C. for 2 hours, and then filtered, washed and dried. The catalyst was immersed in a 1.0 mol/L nitric acid aqueous solution at 70° C. for 2 hours, and then filtered, washed and dried. The treatment with the nitric acid aqueous solution was performed twice.

[Platinum Compound Solution Treatment]

The catalyst after the oxidizing solution treatment was treated with a platinum compound solution. As the platinum compound solution, a platinic chloride aqueous solution (H$_2$PtCl$_6$) was used. The platinum specific surface area (S$_{COMSA-PRE}$) of the catalyst to be treated was measured by a method as described later, and the result showed that the platinum specific surface area (S$_{COMSA-PRE}$) was 88.9 (m$^2$/g-Pt). Further, the platinum content (R$_{Pt}$) of the Pt—Co catalyst after the oxidizing solution treatment is calculated to be 0.472. In this example, 10 g of the catalyst after the oxidizing solution treatment was subjected to platinum compound solution treatment. Thus, the amount of platinum in the platinum compound solution was derived in accordance with Formula 2 above, and set to 1.78 g.

In the platinum compound solution treatment, first 11.9 g of platinic chloride (platinum: 1.78 g) was diluted by 2.5 times. On the other hand, 1 L of a 1 M hydrochloric acid aqueous solution was prepared per 10 g of the catalyst, and the catalyst was dispersed in the hydrochloric acid solution to form a slurry. To the catalyst slurry was added dropwise the platinic chloride aqueous solution (10 mL/min). After the dropwise addition, the mixture was stirred for 24 hours, and filtration and washing were repeated three times. Finally, drying was performed at 60° C. for 24 hours. A Pt—Co catalyst was obtained by the above steps.

Example 2: In this example, a Pt—Co catalyst was produced in the same manner as in Example 1 except that the supporting ratio of catalyst particles (platinum alloy) was changed. At the time of supporting the catalyst metal of Example 1, 600 g of a dinitrodianmine platinum nitric acid solution having a platinum concentration of 4.6% by mass (platinum content: 27.6 g) as a platinum solution was supported on 64.4 g of the same carbon fine powder as in Example 1 to produce a platinum catalyst. A metal salt solution obtained by 60 g of cobalt chloride hexahydrate ($CoCl_2.6H_2O$) was dissolved in 500 mL of water was adsorbed to the platinum catalyst to support cobalt on the platinum catalyst.

As described above, at the time of supporting the catalyst metal (platinum and cobalt), the adsorption amount of the platinum solution and the content of cobalt chloride in the cobalt solution were made smaller than those in Example 1 to decrease the supporting amounts of platinum and cobalt as catalyst metals, so that the supporting ratio of catalyst particles was reduced. Except for these points, the same steps and conditions as in Example 1 were applied to obtain a Pt—Co catalyst.

Example 3: In this example, a Pt—Co catalyst was produced in the same manner as in Example 1 except that the molar ratio (Pt/M) of platinum to the transition metal M (cobalt) was higher than that in Example 1. At the time of supporting the catalyst metal of Example 1, 600 g of a dinitrodianmine platinum nitric acid solution having a platinum concentration of 4.6% by mass (platinum content: 27.6 g) as a platinum solution was supported on 64.4 g of the same carbon fine powder as in Example 1 to produce a platinum catalyst. A metal salt solution obtained by 40 g of cobalt chloride hexahydrate ($CoCl_2.6H_2O$) was dissolved in 500 mL of water was adsorbed to the platinum catalyst to support cobalt on the platinum catalyst.

As described above, at the time of supporting the catalyst metal (platinum and cobalt), the ratio of the supporting amount of platinum to the supporting amount of cobalt was made higher than that in Example 1, so that a catalyst having a Pt/M ratio higher than that in Example 1 was produced. Except for these points, the same steps and conditions as in Example 1 were applied to obtain a Pt—Co catalyst.

Example 4: In this example, a Pt—Ni catalyst having nickel supported as a transition metal M was produced. At the time of supporting the catalyst metal of Example 1, 600 g of a dinitrodianmine platinum nitric acid solution having a platinum concentration of 4.6% by mass (platinum content: 27.6 g) as a platinum solution was supported on 64.4 g of the same carbon fine powder as in Example 1 to produce a platinum catalyst. A metal salt solution obtained by 60 g of nickel chloride hexahydrate ($NiCl_2.s.6H_2O$) was dissolved in 500 mL of water was adsorbed to the platinum catalyst to support nickel on the platinum catalyst.

As described above, a nickel compound solution was adsorbed to the same platinum catalyst as in Examples 2 and 3, the same steps and conditions as in Example 1 were applied to perform alloy formation and acidic solution treatment, and platinum compound solution treatment was performed to obtain a Pt—Ni catalyst.

Comparative Example 1: As a comparative example against the Pt—Co catalyst of Example 1, the Pt—Co catalyst after the oxidizing solution treatment in Example 1 was prepared as Comparative Example 1.

Comparative Example 2: As a comparative example against the Pt—Co catalyst of Example 2, the Pt—Co catalyst after the oxidizing solution treatment in Example 2 was prepared as Comparative Example 2.

Comparative Example 3: The catalysts of Comparative Examples 1 and 2 are the same as in Examples 1 and 2 except that the catalysts are obtained without performing platinum compound solution treatment. That is, in Comparative Examples 1 and 2, platinum is not added to the Pt—Co catalyst after oxidizing solution treatment. In the catalyst of Comparative Example 3, platinum is added to the Pt—Co catalyst after oxidizing solution treatment by a method different from that in Examples 1 and 2.

In Comparative Example 3, platinic chloride in the same amount as in Example 1 (11.9 g) was diluted with water to 3 L, the mixture was adjusted to have a pH of 10, and stirred at 70° C. for 2 hours. This was then cooled to 50° C., 10 g of the Pt—Co catalyst (platinum weight ratio: 0.472) after the oxidizing solution treatment and 10 ml of a reducing agent were then added, the mixture was stirred at 75° C. for 2 hours, and filtration and washing were three times. Finally, drying was performed at 60° C. for 24 hours. A Pt—Co catalyst was obtained by the above steps.

Various physical properties were evaluated for the catalysts of Examples 1 to 4 and Comparative Examples 1 to 3. First, the produced catalyst was subjected to composition analysis to measure the composition ratio of platinum and the transition metal M (cobalt and nickel) forming catalyst particles and the supporting ratio of catalyst particles. The composition analysis was performed by ICP (high-frequency inductive coupling plasma emission analysis). In the analysis by ICP, a solution obtained by weighing 20 mg of a catalyst, firing and reducing the catalyst, adding about 5 ml of aqua regia, dissolving the catalyst to form a solution, and diluting the solution by about 20 times was analyzed.

Next, for each catalyst, the platinum specific surface area ($S_{COMSA}$) was measured by a CO adsorption method. The platinum specific surface area specified here is a value obtained by calculating a surface area from a CO adsorption amount measured in accordance with the specified CO pulse adsorption method, and converting the surface area into a surface area per 1 g of platinum in the sample.

The platinum specific surface area ($S_{COMSA}$) was measured by use of a metal dispersion degree measuring apparatus (BEL-METAL-3 manufactured by Nippon BEL Inc.). 40.0 mg of a sample was precisely weighed to the order of 0.1 mg, and added into a glass cell. A cell was attached to the measuring apparatus, and automatic measurement was started. While a He gas (50 mL/min) was kept flowing, the sample was heated to 100° C. from room temperature over 20 minutes, and held for 15 minutes. The gas was changed to $H_2$ (50 mL/min), and the sample was held at 100° C. for 30 minutes. Next, the gas was changed to He (50 mL/min), and the sample was cooled to 30° C. from 100° C., then heated to 40° C., and held at 40° C. After the above pretreatment was performed, the CO gas adsorption amount was measured by a CO pulse adsorption method. From the obtained CO gas adsorption amount, $S_{COMSA}$ was determined in accordance with the following method.

$$S_{COMSA}(m^2/g\text{-}Pt)=(26.88 \times B \times \sigma)/(A \times R_{Pt})$$ [Formula 3]

(A: weight (g) of sample added into glass cell), B: CO adsorption amount (ml), σ: adsorption gas molecular cross-sectional area (nm² per cell) (0.163 nm² per cell for CO), $R_{Pt}$: content (% by mass) of platinum in catalyst to be measured)

Next, for each catalyst, the catalyst specific surface area ($S_{BET}$) was measured by a BET method. The catalyst specific surface area specified here is a value obtained by calculating a surface area from a monomolecular layer adsorption $N_2$ gas amount measured in accordance with the specified $N_2$ BET multipoint method (constant-volume method), and converting the surface area into a surface area per 1 g of the sample.

The catalyst specific surface area ($S_{BET}$) was measured by use of a chemical/physical adsorption measuring apparatus (NOVA-4200e manufactured by Yuasa Ionics Co., Ltd.) 50.0 mg of a sample was precisely weighed to the order of 0.1 mg, and added into a glass cell. The sample was held in a vacuum state at 100° C. for 30 minutes, and then cooled to room temperature, and a sample-containing cell was precisely weighed to the order of 0.1 mg. The cell was removed and attached to a measurement station, and the amount of $N_2$ gas adsorbed by a $N_2$ BET multipoint method (constant-volume method) was measured. From the obtained $N_2$ gas adsorption method, $S_{BET}$ was determined in accordance with the following method.

$$S_{BET}(m^2/g)=(214.85 \times B \times \sigma)/(C-A)$$ [Formula 4]

(A: weight (g) of glass cell), B: monomolecular layer adsorption $N_2$ gas amount (g), C: weight (g) of sample-containing cell after pretreatment, σ: adsorption gas molecular cross-sectional area (nm² per cell) (0.162 nm² per cell for CO)

Further, for each cell, the configuration of X-ray diffraction analysis catalyst particles was examined. As an X-ray diffractometer, JDX-8030 manufactured by JEOL Ltd. The sample was formed into fine powder, and added into a glass cell, and subjected to X-ray diffraction analysis at a tube voltage of 40 kV, a tube current of 30 mA, and a scan speed of 7°/min and a step angle of 0.1° over a range of 2θ=20 to 90° with a Cu (kα ray) as a X-ray source. XPS was performed at a voltage of 15 kV, a current of 1.66 mA, a beam diameter of 100 μm over a measurement range of 250 μm² with an Al kα ray applied as an X-ray source.

Figure 1:
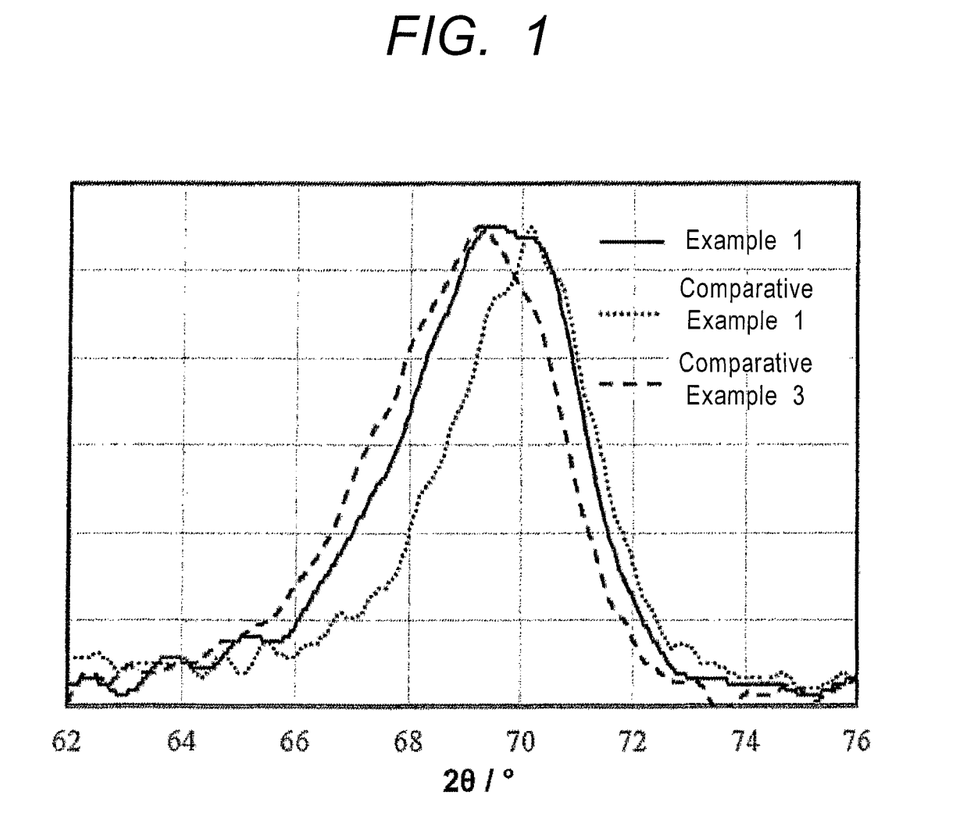
FIG. 1 shows the X-ray diffraction patterns of the catalysts of Example 1 and Comparative Examples 1 and 3.

FIG. 1 shows the X-ray diffraction patterns of the catalysts of Example 1 and Comparative Examples 1 and 3 over a range of 2θ=62° to 76°. In Comparative Example 1, there is a relatively sharp alloy-derived peak as a main peak. On the other hand, in Example 1 and Comparative Example 3, there is a shoulder-like peak indicating influences of atomic platinum. Thus, peak separation was performed on the spectrum of each catalyst, and the intensity of each peak was measured. In the peak separation analysis treatment, peak fitting treatment with a Lorentz function as a peak shape function of each spectrum by commercially available spread sheet software (Microsoft Excel 2013 from Microsoft Corporation).

First, the peak intensity ($I_{cat}$) of the main peak was evaluated in each catalyst. Here, $I_{cat}$ was determined by approximating the main peak in the vicinity of 2θ=69° to 71° by changing $I_{cat}$, u and w by use of Solver commands in Excel in such a manner that the square of a remainder was the minimum in accordance with the Lorentz equation (Formula 1) shown below.

[Formula 5]

$$f(x)=I_{cat}/(1+(x-u)2/w_{cat}2)+I_{base}$$ Formula 1

($I_{cat}$: peak height from base line, u: peak position (degrees), $w_{cat}$: half-width/2 (degrees), $I_{base}$: base line height: (intensity at 2θ=64° in original XRD spectrum))

Next, for evaluating the peak intensity ($I_{Pt}$) associated with crystalline atomic platinum, the remainder obtained by subtracting the value approximated by Formula 1 from the original spectrum was approximated by the following Lorentz equation 2 to determine $I_{Pt}$.

[Formula 6]

$$f(x)=I_{Pt}/(1+(x-67.4)2/w_{Pt}2)+I_{base}$$ Formula 2

($I_{Pt}$: peak height from base line, $w_{Pt}$: half-width/2 (degrees), $I_{base}$: base line height: (intensity at 2θ=64 in original XRD spectrum))

Figure 2A:
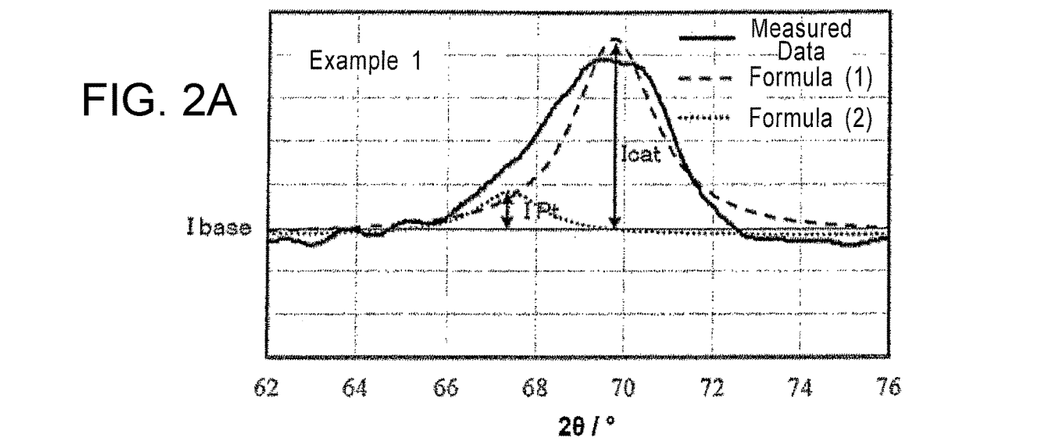
FIGS. 2A, 2B, and 2C show results of performing peak separation on the X-ray diffraction patterns of the catalysts of Example 1 and Comparative Examples 1 and 3.
Figure 2B:
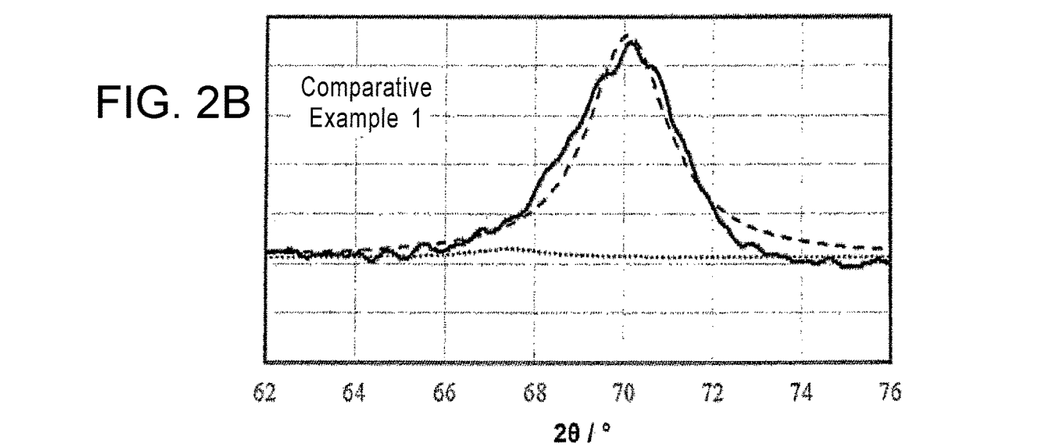
Figure 2C:
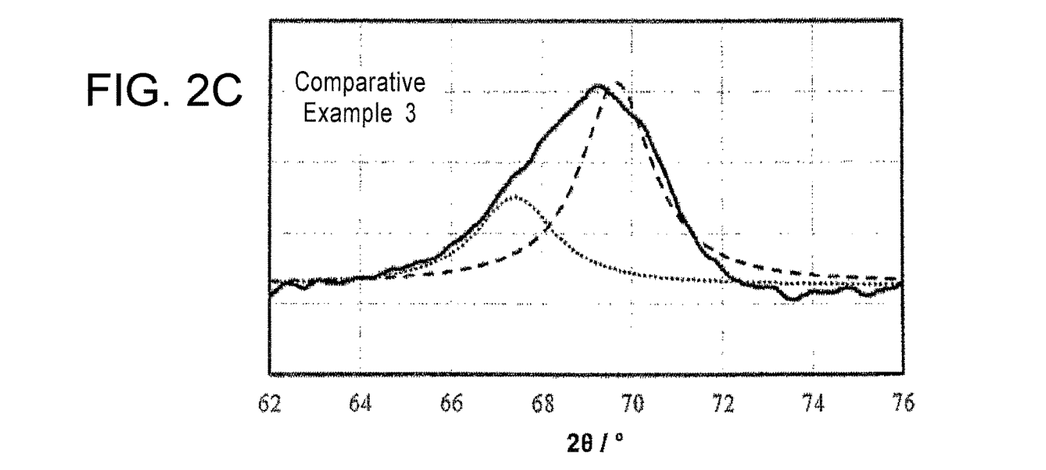

Peak separation results obtained by the above analysis method are shown in FIGS. 2A, 2B, and 2C. $I_{Pt}$ and $I_{cat}$ of the catalyst of Example 1 are shown in FIG. 2A. $I_{Pt}$ and $I_{cat}$ of the catalysts of Comparative Examples 1 and 3 are calculated from the analysis results in FIGS. 2B and 2C, respectively.

Various physical property values for the catalysts of Examples 1 to 4 and Comparative Examples 1 to 3 are shown in Table 1.

TABLE 1

| | Catalyst Configuration | | | | Property Values | | | |
|---|---|---|---|---|---|---|---|---|
| | Metal M | Pt/M | Addition of Platinum | Supporting Ratio | $S_{COMSA}$ (m²/g-Pt) | $S_{BET}$ (m²/g) | $S_{COMSA}/S_{BET}$ | XRD $I_{Pt}/I_{cat}$ |
| Example 1 | Co | 2.92 | Dropwise Addition of H₂PtCl₆ | 52.0 | 96.1 | 337.2 | 0.285 | 0.217 |
| Example 2 | | 3.39 | | 32.0 | 105.5 | 391.6 | 0.269 | 0.079 |
| Example 3 | | 5.01 | | | 115.5 | 418.6 | 0.276 | 0.233 |
| Example 4 | Ni | 2.73 | | | 114.4 | 436.9 | 0.262 | 0.036 |
| Comparative Example 1 | Co | 2.26 | None | 52.0 | 88.9 | 326.9 | 0.272 | 0.038 |
| Comparative Example 2 | | 3.00 | | 32.0 | 125.5 | 484.9 | 0.259 | 0.054 |
| Comparative Example 3 | | 3.67 | Dropwise Addition of H₂PtCl₆ + Reducing Agent | 52.0 | 90.3 | 279.0 | 0.324 | 0.443 |

Measurement results in examples and comparative examples will be discussed with reference to Table 1. First, the catalysts of Example 1 and Comparative Examples 1 and 3 which have the same supporting ratio of catalyst particles will be compared. The measurement results of these catalysts show that in each of the catalysts of Example 1 and Comparative Example 3 in which platinum was additionally supported, the molar ratio of platinum to cobalt (transition metal M) (Pt/M(Co)) is 2.5 or more, and higher than that of the catalyst of Comparative Example 1. This is considered ascribable to that platinum is added after acidic solution treatment.

Concerning the ratio ($S_{COMSA}/S_{BET}$) of a platinum specific surface area ($S_{COMSA}$) measured by a CO adsorption method to a catalyst specific surface area ($S_{BET}$) measured by a BET method, the $S_{COMSA}/S_{BET}$ ratio of the catalyst of Example 1 (0.285, Pt/M=2.92) is slightly larger than the $S_{COMSA}/S_{BET}$ ratio of the catalyst of Comparative Example 1 (0.272, Pt/M=2.26). This may be because platinum is additionally supported. The reason why such results are obtained in Example 1 is that in the catalyst, platinum is additionally supported on the surfaces of catalyst particles, and the carrier is not influenced.

On the other hand, for the catalyst of Comparative Example 3, a high-temperature and short-time reaction is produced by use of a reducing agent at the time of additionally supporting platinum. Such additional support causes precipitation of platinum on the surface of the carrier, and excessive precipitation of platinum of the surfaces of catalyst particles. Thus, $S_{COMSA}$ significantly increases, and the specific surface area ($S_{BET}$) decreases. As a result, the $S_{COMSA}/S_{BET}$ ratio of the catalyst of Comparative Example 3 (0.324) was higher than the $S_{COMSA}/S_{BET}$ ratio of the catalyst of Example 1 (0.285).

Further, concerning the results of XRD analysis, Table 1 shows that the ratio of the peak intensity ($I_{Pt}$) of atomic platinum to the peak intensity ($I_{cat}$) of the main peak ($I_{Pt}/I_{cat}$) in the catalyst of Example 1 is 0.217, whereas the $I_{Pt}/I_{cat}$ ratio in Comparative Example 3 is as high as 0.443. This is considered ascribable to that the presence state of platinum additionally supported in the catalyst of Comparative Example 3 is such that the ratio of atomic platinum present alone is high. Concerning the results of XRD analysis in Comparative Example 1, the $I_{Pt}/I_{cat}$ ratio is 0.038, and lower than that in Example 1. This may be because platinum in the catalyst of Comparative Example 1 is present as platinum alloy, and forms catalyst particles, platinum is not added, and thus there is substantially no atomic platinum.

In the catalyst of Example 1, added platinum is present, but the intensity ($I_{Pt}$) of crystalline atomic platinum is not high in the XRD profile. This is supposed to be because in Example 1, added platinum is in a state of being precipitated in a layered form on catalyst particles which have been present since before the addition of the platinum. It is considered that when the platinum was precipitated in a layered form, the peak intensity ($I_{Pt}$) of atomic platinum was small because of low crystallinity.

Further, comparison between Example 2 and Comparative Example 2 with equal supporting ratios showed that an effect was obtained by additionally supporting platinum. That is, for the ratio ($S_{COMSA}/S_{BET}$) of a platinum specific surface area ($S_{COMSA}$) measured by a CO adsorption method to a catalyst specific surface area ($S_{BET}$) measured by a BET method, the $S_{COMSA}/S_{BET}$ ratio of the catalyst of Example 2 (0.269, Pt/M=3.39) is larger than the $S_{COMSA}/S_{BET}$ ratio of the catalyst of Comparative Example 2 (0.259, Pt/M=3.00).

[Initial Activity Test]

The catalysts of examples and comparative examples (Pt—Co catalyst and Pt—Ni catalyst) were subjected to an initial activity test. This performance test was conducted by measuring the mass activity. In the experiment, a single cell was used, and a membrane electrode assembly (MEA) obtained by sandwiching a proton conductive polymer electrolyte membrane between cathode and anode electrodes having an electrode area of 25 cm² (5 cm×5 cm) was prepared, and evaluated (set utilization efficiency: 40%). As pretreatment, a current-voltage curve was prepared under the conditions of a hydrogen flow rate of 1000 mL/min, an oxygen flow rate of 1000 mL/min, a cell temperature of 80° C., an anode humidified temperature of 90° C. and a cathode humidified temperature of 30° C. Thereafter, the mass activity was measured as main measurement. In the test method, a current value (A) was measured at 0.9 V, a current value (A/g-Pt) per 1 g of Pt was determined from the weight of Pt applied onto an electrode, and the mass activity was calculated.

[Durability Test]

Further, each catalyst was subjected to a durability test (degradation test) for evaluating durability. The durability test was conducted by subjecting the membrane electrode assembly (MEA) after the initial activity test to a potential cycle test. In the potential cycle test, sweeping was performed between 650 mV and 1050 mV at a sweeping speed of 40 mV/s for 20 hours to clean the surfaces of catalyst particles. Thereafter, sweeping was performed between 650 mV and 1050 mV at a sweeping speed of 100 mV/s over 3600 cycles (first cycles), 10800 cycles (second cycles) and 10800 cycles (third cycles) to degrade the catalyst. For catalysts degraded by the third cycles, the mass activity was measured.

The results of the initial activity test and the durability test are shown in Table 2.

TABLE 2

| | Catalyst Configuration | | Property Value $S_{COMSA}/S_{BET}$ | Mass Activity (A/g-Pt) | | |
|---|---|---|---|---|---|---|
| | | | | Initial Activity | Durability Test (After Degradation) | Maintenance Ratio After Degradation |
| | Metal M | Pt/M | | | | |
| Example 1 | Co | 2.92 | 0.285 | 89.0 | 36.4 | 40.9% |
| Example 2 | | 3.39 | 0.269 | 39.9 | 14.4 | 36.1% |
| Example 3 | | 5.01 | 0.276 | 31.7 | 28.1 | 88.6% |
| Example 4 | Ni | 2.73 | 0.262 | 49.2 | 14.1 | 28.7% |
| Comparative Example 1 | Co | 2.26 | 0.272 | 90.0 | 24.7 | 27.4% |
| Comparative Example 2 | | 3.00 | 0.259 | 82.6 | 13.2 | 15.9% |
| Comparative Example 3 | | 3.67 | 0.324 | 74.1 | 14.0 | 18.8% |

As is apparent from Table 2, there is almost no difference in performance between the catalysts of Example 1 and Comparative Example 1 in evaluation performed in terms of initial activity. Concerning durability, however, the catalyst of Example 1 has a smaller reduction in activity after degradation as compared to Comparative Example 1, and has a high maintenance ratio of activity. Thus, the catalyst of Example 1 in which platinum was additionally supported by a suitable method to optimize the ratio ($S_{COMSA}/S_{BET}$) of a platinum specific surface area ($S_{COMSA}$) measured by a CO adsorption method to a catalyst specific surface area ($S_{BET}$) measured by a BET method is shown to have excellent durability.

Concerning durability in Comparative Example 3, the catalyst has larger reduction in activity after degradation as compared to Example 1. The catalyst of Comparative Example 3 is a catalyst in which platinum was additionally supported. It has been shown that whether a catalyst is excellent or poor in durability depends on a method for adding platinum.

From Examples 2 to 4, it can be confirmed that when the $S_{COMSA}/S_{BET}$ ratio is 0.262 or more, durability is improved. In Example 3, the ratio of the supporting amount of Pt was increased, and resultantly, a catalyst having a Pt/M ratio (Pt/M=5.01) higher than that in Example 1 was obtained. As a result of passing through a suitable process, even such a catalyst has a $S_{COMSA}/S_{BET}$ ratio of 2.62 or more, and a high maintenance ratio after degradation. Further, it was shown that even when nickel is used as the transition metal M as in Example 4, it was possible to produce a platinum alloy catalyst having high durability.

INDUSTRIAL APPLICABILITY

The present invention allows to improve the durability of an electrode catalyst for solid polymer fuel cells. The present invention contributes to popularization of fuel cells, and hence provides a foundation for environmental problem solution.

The invention claimed is:

1. A catalyst for solid polymer fuel cells in which catalyst particles comprising platinum and a transition metal M are supported on a carbon powder carrier, wherein
a molar ratio (Pt/M) of the platinum to the transition metal M in the catalyst particles is 2.5 or more, and
a ratio ($S_{COMSA}/S_{BET}$) of a platinum specific surface area ($S_{COMSA}$) measured by a CO adsorption method to a catalyst specific surface area ($S_{BET}$) measured by a BET method is 0.26 or more and 0.32 or less.

2. The catalyst for solid polymer fuel cells according to claim 1, wherein in X-ray diffraction analysis of catalyst particles, a ratio ($I_{Pt}/I_{cat}$) of a Pt-derived peak intensity ($I_{Pt}$) near 2θ=67.4° to a peak intensity ($I_{cat}$) of a main peak appearing in a range of 2θ=69° to 71° is 0.35 or less.

3. The catalyst for solid polymer fuel cells according to claim 1, wherein the transition metal M is at least one transition metal selected from cobalt, nickel, manganese, iron, titanium, vanadium, chromium, copper, zinc and zirconium.

4. The catalyst for solid polymer fuel cells according to claim 1, wherein a supporting ratio of catalyst particles to an entire catalyst is 30 to 70% on a mass basis.

5. The catalyst for solid polymer fuel cells according to claim 2, wherein the transition metal M is at least one transition metal selected from cobalt, nickel, manganese, iron, titanium, vanadium, chromium, copper, zinc and zirconium.

6. The catalyst for solid polymer fuel cells according to claim 2, wherein a supporting ratio of catalyst particles to an entire catalyst is 30 to 70% on a mass basis.

7. The catalyst for solid polymer fuel cells according to claim 3, wherein a supporting ratio of catalyst particles to an entire catalyst is 30 to 70% on a mass basis.

8. A method for producing the catalyst for solid polymer fuel cells as set forth in claim 1, comprising the steps of:
supporting a transition metal M on a platinum catalyst in which platinum particles are supported on a carbon powder carrier;
subjecting the platinum catalyst, on which the transition metal M is supported, to a heat treatment at 700 to 1100° C.;
bringing the catalyst after the heat treatment into contact with an oxidizing solution at least once; and
bringing a platinum compound solution into contact with the catalyst treated with the oxidizing solution.

9. The method for producing the catalyst for solid polymer fuel cells according to claim 8, wherein the catalyst is brought into contact with at least one oxidizing solution selected from a group including solutions of sulfuric acid, nitric acid, phosphorous acid, potassium permanganate, hydrogen peroxide, hydrochloric acid, chloric acid, hypochlorous acid and chromic acid.

10. The method for producing the catalyst for solid polymer fuel cells according to claim 8, wherein at least one platinum compound solution selected from a group including a platinic chloride solution, a dinitrodianmine platinum nitric acid solution and a potassium chloroplatinate aqueous solution is brought into contact with the catalyst.

11. A method for producing the catalyst for solid polymer fuel cells as set forth in claim 2, comprising the steps of:
supporting a transition metal M on a platinum catalyst in which platinum particles are supported on a carbon powder carrier;
subjecting the platinum catalyst, on which the transition metal M is supported, to a heat treatment at 700 to 1100° C.;
bringing the catalyst after the heat treatment into contact with an oxidizing solution at least once; and
bringing a platinum compound solution into contact with the catalyst treated with the oxidizing solution.

12. A method for producing the catalyst for solid polymer fuel cells as set forth in claim 3, comprising the steps of:
supporting a transition metal M on a platinum catalyst in which platinum particles are supported on a carbon powder carrier;
subjecting the platinum catalyst, on which the transition metal M is supported, to a heat treatment at 700 to 1100° C.;
bringing the catalyst after the heat treatment into contact with an oxidizing solution at least once; and
bringing a platinum compound solution into contact with the catalyst treated with the oxidizing solution.

13. A method for producing the catalyst for solid polymer fuel cells as set forth in claim 4, comprising the steps of:
supporting a transition metal M on a platinum catalyst in which platinum particles are supported on a carbon powder carrier;
subjecting the platinum catalyst, on which the transition metal M is supported, to a heat treatment at 700 to 1100° C.;
bringing the catalyst after the heat treatment into contact with an oxidizing solution at least once; and
bringing a platinum compound solution into contact with the catalyst treated with the oxidizing solution.

14. The method for producing the catalyst for solid polymer fuel cells according to claim 9, wherein at least one platinum compound solution selected from a group including a platinic chloride solution, a dinitrodianmine platinum nitric acid solution and a potassium chloroplatinate aqueous solution is brought into contact with the catalyst.

* * * * *